A. J. CONNELLEY.
WATER-PIPE.

No. 174,620. Patented March 14, 1876.

Witnesses:
Lewis F. Kraus,
A. P. Grant.

Inventor:
A. J. Connelley.
by John A. Wiedersheim
atty.

UNITED STATES PATENT OFFICE.

ARTHUR J. CONNELLEY, OF PHILADELPHIA, PENNSYLVANIA.

IMPROVEMENT IN WATER-PIPES.

Specification forming part of Letters Patent No. 174,620, dated March 14, 1876; application filed August 26, 1875.

*To all whom it may concern:*

Be it known that I, ARTHUR J. CONNELLEY, of the city and county of Philadelphia and State of Pennsylvania, have invented a new and useful Improvement in Water-Pipes; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
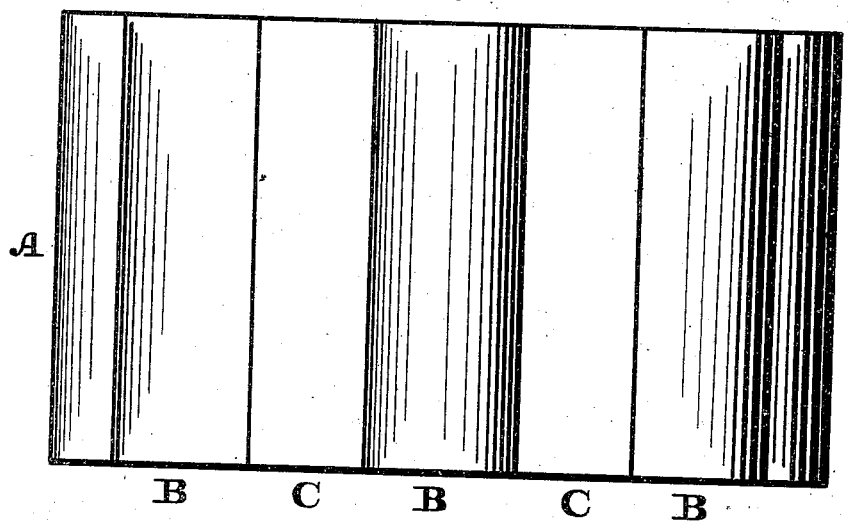
Figure 2:
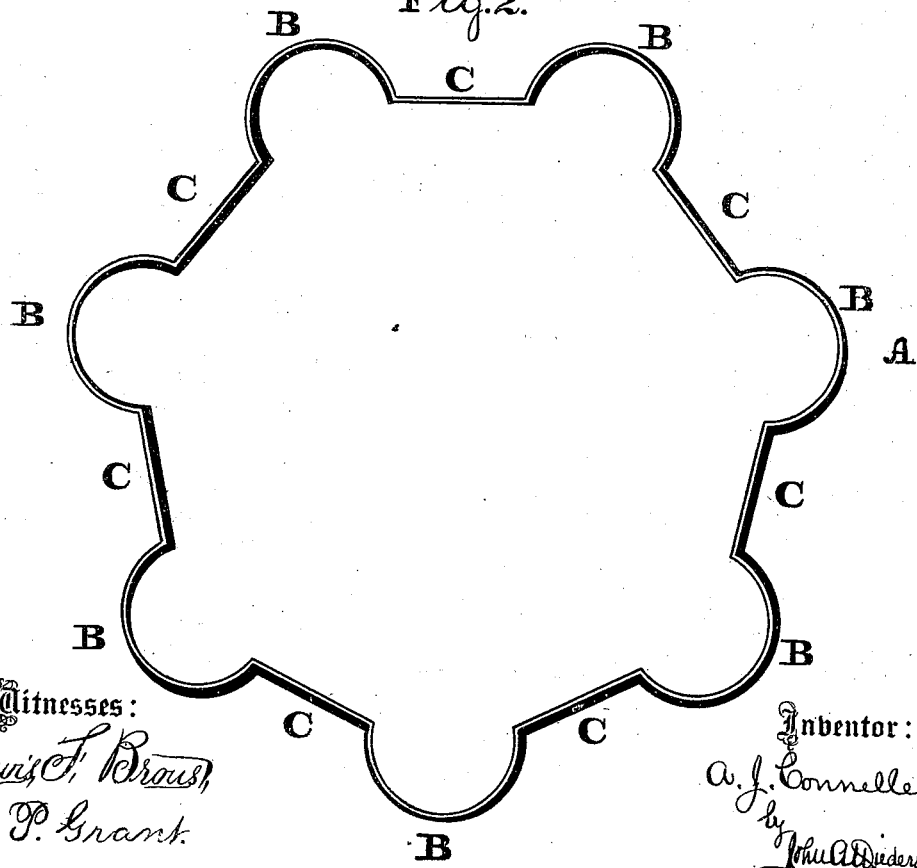

Figure 1 is a side view of a piece of pipe embodying my invention. Fig. 2 is a top or plan view thereof.

Similar letters of reference indicate corresponding parts in the two figures.

My invention consists of an expansion-pipe which is constructed of a series of circular swells, which are united by right lined parts, and constitute a strong, serviceable, and graceful pipe.

Referring to the drawings, A represents the pipe, whose surface consists of a series of circular swells, B, alternating with right-lined parts C, which extend from the base of one swell to the base of the adjacent swell and unite the same.

It will be seen that by this construction the pipe will be strong, serviceable, and graceful. The swells B may face inwardly or outwardly. It will also be seen that the right-lined parts C permit the fullest expansion of the pipe.

I am aware that it is not new to construct a pipe with inward and outward extending corrugations, but as the inward corrugations present arches whose crowns resist the expansion of the pipe my invention will be found to remedy said defect, and is therefore an improvement in the art.

Having thus described my invention, what I claim as new, and desire to secure by Letters Patent, is—

The pipe A, consisting of a series of circular swells, B B, in combination with right-lined parts C, uniting the bases of the swells, as shown and described, and for the purpose set forth.

ARTHUR J. CONNELLEY.

Witnesses:
JOHN A. WIEDERSHEIM,
A. P. GRANT.